Patented Jan. 16, 1923.

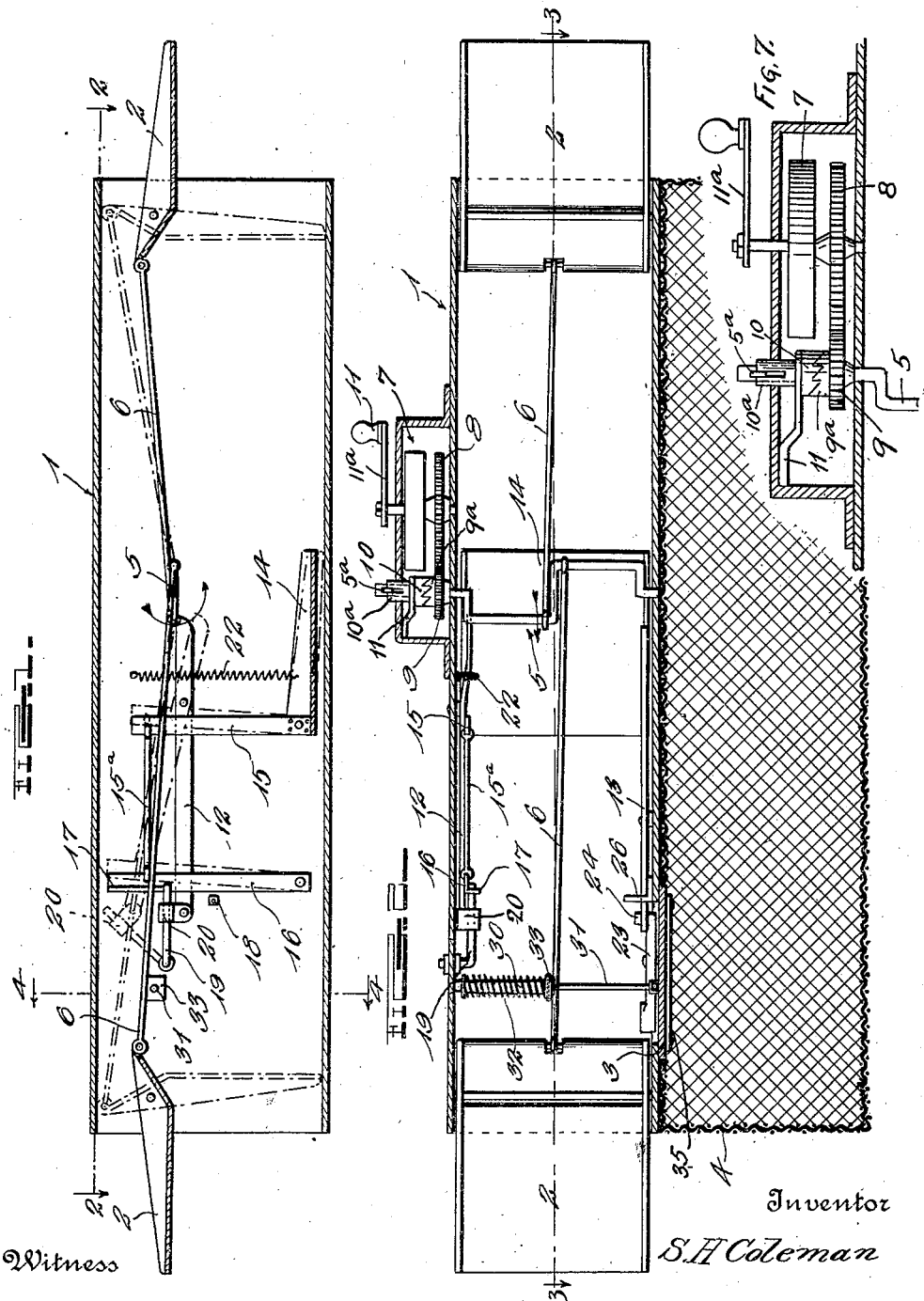

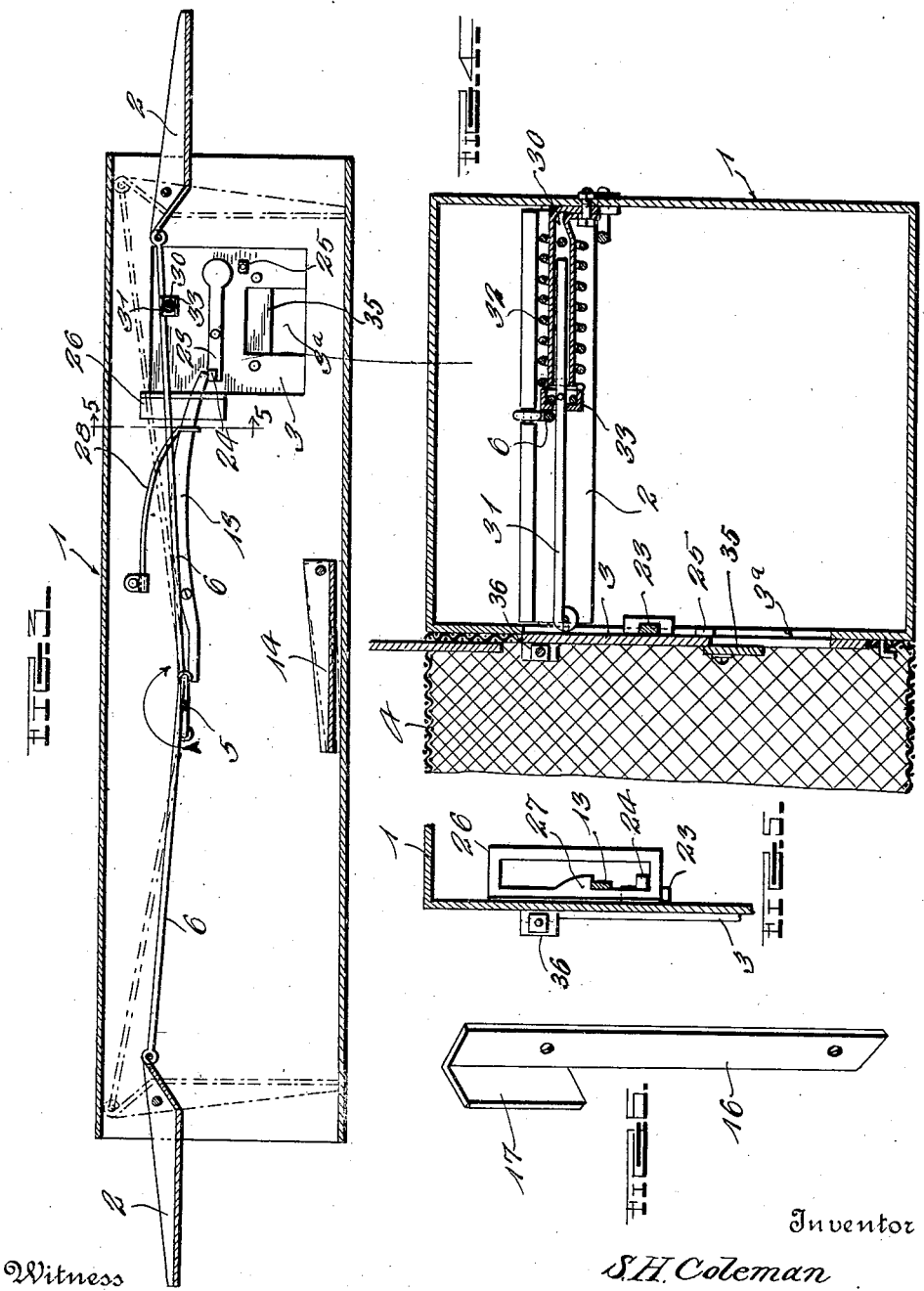

1,442,252

UNITED STATES PATENT OFFICE.

SAMUEL H. COLEMAN, OF VILLISCA, IOWA.

ANIMAL TRAP.

Application filed May 26, 1921. Serial No. 472,779.

*To all whom it may concern:*

Be it known that I, SAMUEL H. COLEMAN, a citizen of the United States, residing at Villisca, in the county of Montgomery and State of Iowa, have invented certain new and useful Improvements in Animal Traps; and I do declare the following to be a full, clear, and exact description of the invention, such as will enable others skilled in the art to which it appertains to make and use the same.

This invention relates to an improved animal trap, and it has particular reference to a device of this class which is of the self and everset type, that is, a trap which is such in construction that after one animal has been caught, this animal through its interference with certain mechanism, automatically resets the trap to catch another animal and so on.

Another object of the invention is to generally improve upon devices of this class by producing one of extreme simplicity and durability, which is entirely effective in operation and extremely inexpensive to both the manufacturer and the user.

A further object of the invention is to provide an animal trap including a plurality of compartments, one of which is provided with inlets and outlets and is provided with the animal controlled trip mechanism for closing the doors, the other compartment being in the form of a cage into which the animal passes after having been entrapped in the first compartment, and there being novel mechanism associated with the outlet door which leads into the cage to prevent the animal from reentering the first compartment.

Other objects and advantages of the invention will be apparent during the course of the following description.

In the accompanying drawings, forming a part of this specification, and in which like numerals are employed to designate like parts throughout the same:

Figure 1 is a longitudinal vertical sectional view of the trap compartment of the device, showing more clearly the animal controlled trip mechanism which acts on the door controlling shaft through the medium of the mechanism there shown.

Figure 2 is a sectional view taken on the plane of the line 2—2 of Figure 1, looking in the direction of the arrows, showing clearly the general arrangement of the compartments and actuating mechanism.

Figure 3 is a central longitudinal section taken on the line 3—3 of Fig. 2 showing the outlet door which carries means for acting on the other mechanism for retaining the inlet door actuating shaft against rotation.

Figure 4 is an enlarged sectional view taken on the line 4—4 of Fig. 1.

Figure 5 is a detail section taken on the line 5—5 of Fig. 3.

Figure 6 is a perspective view of one of the details of the device.

Figure 7 is an enlarged detail section of the spring motor employed to drive the crank-shaft.

Referring to the drawings, wherein the preferred embodiment of my invention is clearly illustrated, it will be seen that the numeral 1 designates a substantially rectangular box which is open at its opposite ends and is provided in one of its vertical side walls with an opening. Both the open ends of the box and the opening in the side wall is closed by doors 2 and 3, the first named doors being here termed as the inlet doors while the second named door 3 is here termed as the outlet door. By preference, the outlet door 3 is hingedly mounted at 36 and communicates with a cage 4 or other suitable compartment, in which the animal is retained so as to permit the first named compartment 1 to be free to catch other animals. It is to be noted that this door is formed with an opening 3ª through which the light passes and this opening is reduced in size by extending a small strip 35 across it. In order to induce the animal to enter the compartment 1, the doors closing the open ends thereof are normally held in elevated positions as disclosed in Fig. 1, this being done by means of an automatically rotatable transversely disposed shaft 5 which is arranged in this compartment and is connected to the doors at the opposite ends through the medium of links 6. The shaft 5 referred to, may be of any construction and may be automatically rotated by any suitable means. The means employed for the purpose of rotating the crank-shaft may be of any suitable construction. For the purpose of illustration, however, I have shown a spring motor which embodies a casing 7 having a spring therein which serves to rotate a shaft on which a gear 8 is fixed. This gear meshes with a pinion 9 which is loosely mounted on that part of the crank shaft 5 which projects through the adjacent side of the trap. This pinion is equipped with an integral toothed hub-like extension 9a which co-acts with a clutch 10 having a slotted sleeve extension 10a through which one end of the crank shaft 5 extends. A small key 5a carried by the crank shaft is received in the open-ended slot in the sleeve 10a and the clutch member is thus coupled to the shaft in such a manner as to permit it to rotate therewith and to permit it to slide thereon for the purpose of permitting free rotation of the pinion 9 in one direction when it is desired to rapidly unwind the spring. A flat spring 11 co-acts with the clutch member to hold it in operative engagement with the aforesaid hub 9a. A suitable handle 11a is for the purpose of winding the spring. With this arrangement, it is obvious that when the spring is being wound to tension it and drive the crank-shaft for operating the trap doors, the toothed hub of the pinion simply ratchets over the teeth of the clutch member and does so without effecting rotation of the crank-shaft due to the fact that it is loosely mounted on said shaft. However, if the pinion is driven by the spring in an opposite direction, that is from right to left, it will be seen that the shaft will be rotated in this direction, due to the fact that the pinion becomes coupled to the shaft through the medium of the clutch member.

It is desirable to retain the doors 2 in elevated positions in order to induce the animal to enter the compartment 1. Various means may be employed for this purpose, this means being here shown in the form of a pair of levers 12 and 13 which are pivotally mounted intermediate their ends on opposite vertical walls of the compartment 1, each lever having one end arranged to extend beneath and engage the adjacent crank portion of the shaft 5 to prevent rotation of the latter. It is necessary in order to have these levers perform the above named function, to retain them against pivotal movement, and suitable means is employed for this purpose. Since, as it will be seen from carefully examining the drawings, the lever 12 is operated by mechanism entirely independent of the mechanism for operating the lever 13, the two different mechanisms will be separately described for the purpose of clearness. The mechanism for retaining the lever 12 in immovable position and permitting it to swing on its pivot at the proper time, is in the form of trip mechanism which is actuated by the weight of the animal who interferes with it. The trip device last referred to, is more clearly disclosed in Fig. 1. By reference to this figure, it will be seen that it comprises a transverse pivotally mounted platform 14 which carries a rigid upright 15, the latter having operative connection by means of a link 15a with a movable bar 16 which carries a shoulder 17 beneath which one end of the pivoted arm 19 is arranged in order to retain the parts in immovable or operative position. A stop 18, is employed for the purpose of limiting swinging movement of the bar 16 in one direction and a guide eye 20 is employed for connecting the lever 12 and arm 19 together and by this construction the upward movement of the lever 12 is limited. A stop (not shown) could be employed for limiting the movement of the arm 19 in one direction. For the purpose of returning the platform 14 to its normal position and also returning the parts with which it coacts to operative position, a coiled spring 22 is employed. With this construction and arrangement of parts, it will be seen that as the animal enters the compartment 1 and passes therethrough, he will tread upon the platform 14, causing the latter to swing downward toward the bottom of the compartment against the action of the spring 22. In so doing, the parts 15 and 16 with which it is connected will be moved to the dotted line positions and will cause disengagement of the shoulder 17 from the member 19. Then, the lever 12 will move upwardly and its inner end will become disengaged from the crank shaft 5 and permit rotation of the latter in the direction indicated by the arrow. It is obvious, that as the crank shaft rotates, the links 6 will take the dotted line position here indicated and will move the doors 2, with which they are connected, to closed position and the animal will be entrapped.

The lever 13 already referred to, is operated by a similar mechanism which is caused to become effective by the closing of the outlet door 3 after the latter has been pushed open by the animal trying to escape through it. This mechanism includes a weighted lever 23 which is pivoted intermediate its ends on the outlet door 3, this lever having a laterally turned end 24 on which the adjacent end of the lever 13 rests when the door 3 is closed. The downward movement of the weighted lever 23 is limited by means of a stop 25 on the door 3. The lever 13 is retained in operative position, as is the lever 12, by means of a keeper 26 which is provided with a shoulder 27 which engages it as clearly disclosed in Fig. 5. A spring 28 of suitable construction is connected to the lever 13 for the purpose of automatically engaging it with said shoulder and suitable means is employed for the purpose of automatically returning the weighted lever 23 to the position disclosed in Fig. 3, after the door 3 closes.

Since the animal, after once entering the cage 4 might possibly open the door 3 and reenter the compartment 1, it is desirable to provide means to prevent such opening of the outlet door. While this means may be of any other construction, I prefer to make use of a tubular member 30 and I connect this member to one of the vertical walls of the compartment 1, there being a rod 31 which is connected to the door 3 slidable in this tubular member 30. A coiled spring 32 surrounds the member 30 and is connected thereto and also to the shoulder 33 on the rod 31, it being obvious that this spring serves to automatically close the outlet door 3. Attention is directed at this point to the fact that one of the links 6 adjacent the mechanism just described, engages behind the shoulder 33 when the end doors 2 are open and serves to prevent movement of the rod 31 and thus locks the outlet doors against opening. Link 6 only engages the shoulder 33 when the doors are in an open position and as soon as the doors are moved to closed position, this link is raised to the dotted line position indicated in Fig. 3 and is automatically disengaged from the shoulder. Thus, relative sliding movement of the parts 30 and 31 is then permitted.

Although it is thought that the foregoing description is sufficient to enable persons who read this specification to obtain a clear understanding of the operation thereof, it is deemed advisable to briefly review the operation of the device, which is as follows:

Assuming that the various parts of the device are in the position shown in full lines in various views which would position the inlet doors 2 in elevated positions, the entrance of the animal into the compartment 1 would be unobstructed. The animal, of course, could enter the compartment 1 from either end. As it enters, it will naturally walk upon the platform 14 and in so doing will tilt the same towards the bottom of the compartment as indicated in dotted lines. Such movement of the platform will impart movement to the member 16 through the medium of the part 15 and the arm 19 will become disengaged from the shoulder 17, permitting the adjacent end of the lever 12 to move upwardly due to the pressure exerted on the opposite end thereof by the spring rotated crank shaft 5. As the lever 12 moves to this position, the crank shaft will rotate in the direction indicated by the arrow in Fig. 1 for approximately one-half a revolution. Rotation of the crank shaft in this manner will close the inlet doors 2, and the previously unengaged crank portion of the shaft 5 will become engaged with the lever 13 and will be prevented from against further rotation thus retaining the inlet doors in closed position. The animal being trapped in the compartment 1 and seeing the light which comes through the opening 3ª in the outlet door will naturally try to make a get-away through this door. Pressure exerted by the animal against the outlet door will move it inwardly into the cage 4 and will permit him to enter the latter, from which there is no escape. As the outlet door returns to its normal closed position, the weighted lever 23 which has then assumed an inclined position, will cause the lateral end 24 thereof to strike the lever 13 and disengage it from the shoulder 27. The lever 13 will then be free to move on its pivot and as in the case with the lever 12, the pressure being exerted on its outer end by the spring rotated crank shaft, will move it to such a position as to permit the crank shaft to rotate for another half revolution until it becomes again engaged with the lever 12, after which it will remain in position until another animal enters the trap and the above described operation is repeated. The spring 28 will again engage the lever 13 with its locking shoulder 27 and the same spring will automatically return the weighted lever 23 to its effective position, that is to the position in which it is shown in Fig. 3. To explain this more thoroughly, it is to be stated that the lever 23 only has limited swinging movement and when the inner end of the lever is disengaged and moved to ineffective position, the adjacent end of the latter swings above the laterally directed end 24 of the weighted lever and when the spring 28 comes into play, this end of the lever 13 strikes the lug 24 and automatically returns the lever 23 to operative position. The spring 28 must therefore be sufficiently strong to lift the weighted end of the lever 23 in addition to moving the lever 13 on its pivot. As before described, as the inlet doors 2 move to open position, one of the links 6 which are connected therewith will engage the shoulder 33 of the outlet door retaining device, and will prevent possible opening of this door.

From the foregoing description, it will be seen that I have devised a self and ever-set trap of considerable utility, which is reliable in operation, strong, durable and inexpensive to manufacture. Quite a number of animals may be caught before it is necessary to rewind the spring of the motor 7 to insure rotation of the door operating shaft.

A careful consideration of the foregoing description taken in connection with the accompanying drawings, will enable persons skilled in the art to which this invention appertains to obtain a clear understanding of the same. Therefore, a more lengthy description is deemed unnecessary.

The construction and arrangement of parts herein described and disclosed is taken as the preferred embodiment of my invention. However, I wish it to be understood that various minor changes in the shape, size, and arrangement of parts may be resorted to as long as these changes do not depart from the spirit of the invention or the scope of the subjoined claims.

I claim:

1. An animal trap comprising a body provided with inlet and outlet openings, doors for closing said openings, said inlet door being normally open and said outlet door being normally closed and moved to open position by the animal, an automatically rotatable shaft arranged in said body, a connection between said shaft and inlet door for automatically opening and closing the latter, animal actuated means supported on one side of said body and co-operable with said shaft for releasing the latter and permitting a limited rotation thereof for closing said inlet door, and separate and independent means co-operable with the outlet door and also cooperable with said shaft for releasing the latter when the outlet door is moved to open position and resumes its normal closed position.

2. An animal trap comprising a body provided with inlet and outlet openings, doors for closing said openings, the outlet door being normally closed, an automatically rotatable shaft arranged in said body, animal actuated means for releasing said shaft for permitting rotation thereof, holding and checking means supported in said body and co-operable with said shaft for limiting the rotation thereof, and means supported on said outlet door for engaging said holding and checking means to release the latter after said last named door is swung to open position and resumes its normal closed position, whereby said shaft will be permitted to again rotate until checked by the first named animal actuated means.

3. An animal trap comprising a body provided with inlet and outlet openings, pivoted doors closing said openings, an automatically rotatable crank shaft arranged in said body, a connection between said crank shaft and inlet door for actuating the latter, animal actuated means co-operable with said shaft for releasing the latter to permit initial rotation thereof for closing said inlet door, said means being automatically returned to a position to act as a stop for limiting the rotation of said shaft when the latter is actuated to swing the inlet door open again, a lever pivoted in said body and having one of its ends engageable with said shaft to act as holding and checking means for said shaft, a bracket having a shoulder with which said lever is co-operable for retaining the latter in operative position, and means carried by said outlet door for striking said lever and disengaging it from said shoulder when the outlet door is swung to closed position after being opened by the animal.

4. The structure set forth in claim 3, together with a spring associated with said lever for automatically reengaging the latter with said shoulder and for engaging it with the means carried by the outlet door for automatically returning said means to inoperative position.

5. An animal trap comprising a body provided with an inlet opening at one end and an outlet opening in one side, pivotally mounted doors for closing said openings, said outlet door being normally closed, an automatically rotatable crank shaft supported in said body, a connection between said shaft and inlet door for actuating the latter, animal actuated means in said body for releasing said shaft to permit initial rotation thereof for closing said inlet door, a lever pivoted between its ends on one side of the body, having its inner end positioned for engagement with said crank shaft for checking and holding the latter to limit the rotation thereof at the time the inlet door is closed, a bracket secured to the same side of said body adjacent said outlet opening, said bracket including a shoulder with which the other end of said lever is normally engaged, automatically operable means carried by said outlet door for disengaging said lever from said shoulder when said outlet door is swung to closed position, after being opened and unitary means in said body and co-operable with said lever for automatically reengaging the latter with said shoulder and for automatically returning said last named means to inoperative position.

6. The structure set forth in claim 5, the means carried by said outlet door being a lever pivoted between its ends, being weighted at one end and having a lateral extension at its opposite end which is designed to engage said first named lever.

7. An animal trap comprising a body having inlet and outlet openings, doors for closing these openings, an automatically rotatable crank shaft arranged in said body, a connection between said shaft and inlet door, spring actuated means including a shoulder for automatically closing and maintaining the outlet door closed until the inlet door is closed, the aforesaid connection normally engaging said shoulder to prevent opening of the outlet door until the inlet door is closed.

8. The structure set forth in claim 7, said spring actuated means being in the form of a spring-controlled telescoping member, one part of which is connected to the body and the other part to the outlet door.

9. An animal trap comprising a body provided in one side with an outlet opening and at one end with an inlet opening, doors closing said openings, a transversely disposed automatically rotatable crank-shaft in the body, a link connected to the shaft and inlet door, a sleeve connected to one of the side walls of the body opposite the outlet door, a rod connected to this door and slidable in said sleeve, a shoulder on said rod, and a coiled spring surrounding the sleeve and connected to the shoulder, serving to resist extension of the rod and sleeve, the aforesaid link engaging behind said shoulder and preventing extension of the sleeve and rod when the inlet door is open.

10. An animal trap comprising a body provided with inlet and outlet openings, pivoted doors for closing said openings, the outlet door being normally closed, an automatically rotatable shaft arranged in said body, a pivoted lever having one of its ends engaged with said shaft to hold the latter against rotation, a movable member including a shoulder with which the opposite end of said lever co-operates for normally retaining said lever in operative position, animal actuated means co-operable with said movable member for disengaging said lever from said shaft, means for automatically returning the latter to operative position, and holding and checking means for the shaft controlled by said outlet door.

11. An animal trap comprising a body provided with inlet and outlet openings, pivoted doors for closing said openings, the outlet door being normally closed and the inlet door being open, an automatically rotated crank shaft supported in said body, a connection between said shaft and inlet door for actuating the latter, a lever pivoted between its ends on one of the side walls of the body, having its inner end engaged with said shaft for holding the latter against rotation, means co-operating with the opposite end of said lever for holding said lever immovable, an animal actuated trip device associated with said means for moving the latter to permit pivotal movement of said lever, and separate and independent means controlled by said outlet door for checking and holding said shaft when the inlet door is closed.

12. An animal trap comprising a body provided with inlet and outlet openings, pivoted doors for closing said openings, an automatically rotated crank shaft supported in said body, a connection between said shaft and inlet door for actuating the latter, a lever pivoted between its ends on one side of said body and having its inner end engaged with said shaft for holding the latter against rotation to maintain the inlet door open, a pivotally mounted shouldered arm associated with the opposite end of said lever for holding the latter against movement, an animal tilted platform arranged in said body, a connection between said platform and arm for moving the latter to permit movement of said lever for disengaging said crank shaft and permitting rotation thereof, means for automatically returning said platform to its normal position, and separate and independent means supported on the opposite side of the body and controlled by said outlet door for co-operation with said shaft for checking and holding the latter when the inlet door is moved to closed position.

In testimony whereof I have hereunto set my hand.

SAMUEL H. COLEMAN.